(12) United States Patent
DaSilva et al.

(10) Patent No.: US 6,215,448 B1
(45) Date of Patent: Apr. 10, 2001

(54) BROADBAND COUPLER FOR MEASUREMENT OF ANTENNA SIGNALS

(75) Inventors: Marcus K. DaSilva, Peninsula Newman Lake; Ryan Lowell Hendrickson, Spokane, both of WA (US)

(73) Assignee: Agilent Technologies, Palo Alto, CA (US)

( * ) Notice: Subject to any disclaimer, the term of this patent is extended or adjusted under 35 U.S.C. 154(b) by 0 days.

(21) Appl. No.: 09/365,370

(22) Filed: Jul. 30, 1999

(51) Int. Cl.[7] ....................................... H01Q 1/28
(52) U.S. Cl. ..................... 343/703; 343/850; 343/905
(58) Field of Search ........................... 343/703, 789, 343/820, 822, 850, 860, 904, 905, 906

(56) References Cited

U.S. PATENT DOCUMENTS

| | | | | |
|---|---|---|---|---|
| 4,134,119 | * | 1/1979 | Sandoz et al. | 343/703 |
| 4,496,953 | * | 1/1985 | Spinks, Jr. et al. | 343/822 |
| 5,394,162 | * | 2/1995 | Korovesis et al. | 343/703 |
| 5,557,287 | * | 9/1996 | Pottala et al. | 343/703 |
| 5,625,891 | * | 4/1997 | Tucker et al. | 455/67.2 |
| 5,751,253 | * | 5/1998 | Wells | 343/749 |

* cited by examiner

Primary Examiner—Don Wong
Assistant Examiner—Thuy Vinh Tran
(74) Attorney, Agent, or Firm—Edward L. Miller

(57) ABSTRACT

A selected length of antenna for a device under test is placed within a conductive inner cylinder, forming an unterminated "input" coaxial transmission line. The inner cylinder is in turn within and coaxial with a conductive outer cylinder, forming an "output" transmission line. The inner cylinder is the center conductor of the output transmission line, and in a region extending beyond the extent of the antenna therein, conically tapers to being a normal center conductor of solid cross section. The outer cylinder matches this taper to maintain a constant characteristic impedance $Z_{0out}$ (say, 50 $\Omega$) for the output transmission line, which then delivers its output signal to a matched terminating load in measurement equipment via either a coaxial connector or an interconnecting length of auxiliary transmission line. These triaxially nested input and output transmission lines are supported at a driven end by an RF tight box that contains a mounting fixture to support the device under test in a fixed and appropriate relation to the triaxially nested input and output transmission lines, and that is lined with anechoic RF absorbing material.

9 Claims, 3 Drawing Sheets

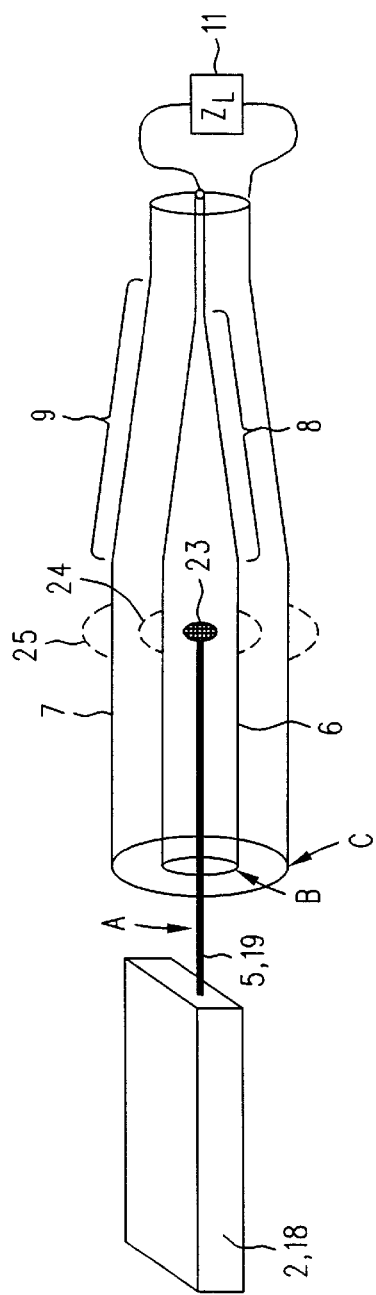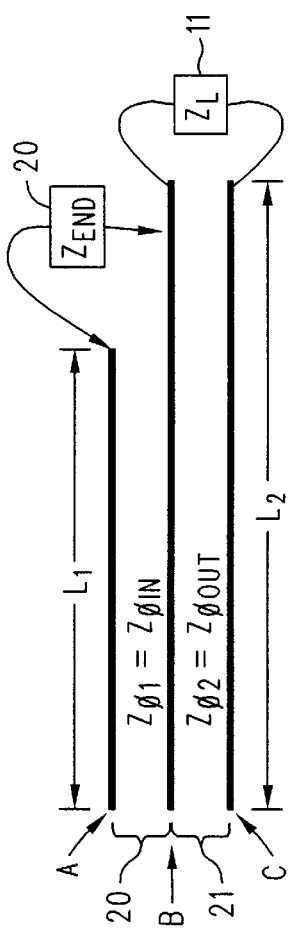
FIG. 2
FIG. 3

BROADBAND COUPLER FOR MEASUREMENT OF ANTENNA SIGNALS

BACKGROUND OF THE INVENTION

Cellular telephony and other forms of radio based communication are becoming increasingly popular. As the radio frequency spectrum becomes more crowded and heavily used, the various regulatory agencies have found it necessary to impose tight restrictions on the RF emissions of such devices. In conjunction with certifying that the device complies with regulations, the manufacturer may need to operate it over a wide range of conditions and verify that such measurable quantities as power level and frequency are within specified limits. For example, for both regulatory compliance and customer related quality assurance reasons, exhaustive testing of an extensive collection of such operations might be performed at the factory before the unit is shipped. Additional manufacturing concerns include trouble shooting during assembly and routine Quality Assurance checks.

Regardless of whether "lab bench" type test equipment or production line oriented "automated test equipment" is used by a manufacturer to perform such measurements, it is quite likely that some sort of fixture is necessary to connect the test equipment to the item to be tested. Such a fixture needs to be easy to use and produce repeatable results. It should not unduly affect the measured results, and any effects it does produce should be "removable" by compensation or application of calibration constants. It would also be desirable if such a fixture were durable and relatively inexpensive.

Once a unit has been sold it may later need service. The unit might or might not be completely inoperative, and the owner or user of the unit may wish to bring it to a location for servicing that might, for example, be the retail location where the unit was originally purchased. The idea is that the unit can be tested by minimally trained personnel at the retail establishment to ascertain if at least its major functions are operational. An automated test set can be used to perform these tests, and its level of sophistication may range from basic and fundamental tests common to all brands of devices meeting a particular class of service, to exhaustive factory level verification for a specific model from a particular manufacturer. Economic considerations and the level of skill sometimes needed to configure the tester and interpret results are a factor in test set design.

Such a test set may be used at a retail establishment to verify proper operation: (a) upon initial sale; (b) upon initial configuration or reconfiguration of configurable properties within the unit; (c) subsequent to a repair; and, perhaps most importantly (d) assist in deciding if a unit that has been in for service is in need of repair.

Thus, manufacturers, retail sales outlets and field service organizations all have a need for a fixture that will couple a wireless telephone, radio or other RF device to various types of test equipment.

Let us refer to the wireless telephone, radio or other RF device to be tested as the DUT (Device Under Test). The DUT will sometimes have a jack for an external antenna which, when a suitable plug is inserted therein, will disconnect the antenna from the DUT and connect in its place whatever is connected to the plug. There are at least three reasons why the use of such an external antenna jack may not be suitable for exhaustive factory level testing, service center (depot) testing, or cursory trouble shooting and testing performed by relatively untrained personnel at retail establishments. First, there may be more than just the antenna that is disconnected; it might be an antenna and a matching network, so that as far as the DUT is concerned the test set-up is a noticeably different electrical arrangement requiring informed interpretation for proper understanding. Second, the manufacturer may expect that such a connector will be seldom used anyway, and be prone to avoid the expense of utilizing a truly robust connector. The switching function of the connector located in the "blow hole" of some brands cell phone have been observed to fail after a mere half-dozen or so uses. Third, there is the mundane issue of having on hand the proper plug to fit the jack. Some manufacturers are fond of truly odd or proprietary designs, which may be hard to find or, worse, are no longer supplied.

A desirable alternative to this situation is to couple RF energy directly from the antenna of a DUT into the measuring test equipment or other test set (hereinafter called the measuring equipment). This has the further advantage of testing the thing of interest "as is", so to speak, without introducing any extraneous circumstances that complicate the issue. This implies the use of some sort of coupler between the antenna of the DUT and the measuring equipment. In principle, the same coupler can be used for tests that involve applying RF energy from a source in the measuring equipment to the DUT.

Such a coupler should have a number of properties. It should be flat; that is have a relatively constant amount of attenuation over the frequency band or bands of interest. For wireless phones in the U.S. this might be more than one band, say, 825–895 MHZ ("cellular") and 1.850–1.990 GHz (PCS). It is even better if two such bands (as found in dual mode phones) can be construed as a single band (0.825–1.99 GHz). Either way, the amount of attenuation should be small, say on the order of three to six dB. The reason for this latter requirement is that some specifications for cell phones are really quite rigorous. The specification for power measurement may be ±2/10 dB at −55 dBm for a carrier at 1.8 GHz. If the coupler has a 20 dB of attenuation, then even a top of the line laboratory spectrum analyzer (or power meter) may be unable to resolve to 2/10 dB at such low levels, owing to its internal noise floor. Finally, considering the frequencies involved (for wireless phones, anyway) the coupler ought to not touch the antenna, but rely on true electromagnetic coupling instead of ohmic contact. The reasons for this are readily understood when it is appreciated that: (a) The antenna is often covered with a nonconductive sheath or coating; (b) Such a mechanical contact inserts an unwanted impedance into the measurement setup; and (c) Such a mechanical contact is apt to be unreliable and of questionable repeatability.

One prior art coupler manufactured by Wavetek (Triangle Park, N.C.). It consists of a tablet within which are embedded several patch antennae. A clamp hold the DUT in a fixed location. It appears to have about 26 dB of loss, and also leaves something to be desired with respect to repeatablilty.

Another prior art coupler design, manufactured by ETS (P.O. Box 80589, Austin, Tex.), for a wireless phone incorporates a single patch antenna of empirically determined shape into a shielded anechoic box. Mechanical fixturing holds the phone in a predetermined position relative to the patch antenna, but different coupling coefficients obtain for each model having a different case.

Thus it would be desirable if there were an affordable and technically adequate antenna driven coupler for radios and wireless phones that offered high bandwidth, flat response and low loss.

SUMMARY OF THE INVENTION

The antenna of a device under test is extended and a selected length thereof is placed within a conductive inner cylinder and generally along the axis thereof The antenna and the inner cylinder form an unterminated "input" coaxial transmission line of constant characteristic impedance. The inner cylinder is in turn within and coaxial with a conductive outer cylinder, with which it forms an "output" transmission line of constant characteristic impedance. The inner cylinder is the center conductor of the output transmission line, and in a region extending beyond the extent of the antenna therein, conically tapers to being a normal center conductor of solid cross section. The outer cylinder matches this taper to maintain a constant characteristic impedance $Z_{0out}$ (say, 50 Ω) for the output transmission line, which then delivers its output signal to a matched terminating load in measurement equipment via either a coaxial connector or an interconnecting length of auxiliary transmission line. These triaxially nested input and output transmission lines are supported at a driven end by an RF tight box that contains a mounting fixture to support the device under test in a fixed and appropriate relation to the triaxially nested input and output transmission lines, and that is lined with anechoic RF absorbing material. The RF tight box prevents signals in the external environment from contaminating the measurement. The anechoic material reduces the effects of stray radiation from parts of the DUT other than the antenna; a Q of less than two is desirable. Within the device under test is some counterpoise for the antenna. Typically the counterpoise is the chassis, or perhaps the case, of the DUT. A coupling impedance $Z_c$ exists between that counterpoise and the lip of the outer cylinder closest the device under test. The input transmission line also has a characteristic impedance $Z_{0in}$. The three impedances $Z_c$, $Z_{0out}$ and $Z_{0in}$ form a power splitting divider through which the power delivered to the antenna flows. The two characteristic impedances represent entrances to paths through which fractions of the power are directed. That fraction of the power that initially enters the output transmission line is delivered directly to the test set. Power that initially enters the input transmission line is (ignoring losses) totally reflected, and is subsequently divided among a number of possible paths: back into the device under test, reflection back into the input transmission line, and into the output transmission line. The various fractions, their reflections and re-reflections (and so on) combine to form a steady state outcome that adequately couples the antenna in a known and repeatable way to the load in the test set. A time domain explanation such as the foregoing is a useful simplification, although messy owing to the extended summations required. The transmission line equations may be used to obtain a closed form characterization of the behavior of the coupler and select parameters that optimize performance for particular circumstances.

BRIEF DESCRIPTION OF THE DRAWINGS

FIG. 2 is a simplified quasi-pictorial diagram of the coupling between the antenna of a device under test and a load;

FIG. 3 is an equivalent transmission line representation of the arrangement depicted in FIG. 2;

DESCRIPTION OF A PREFERRED EMBODIMENT

Figure 1:
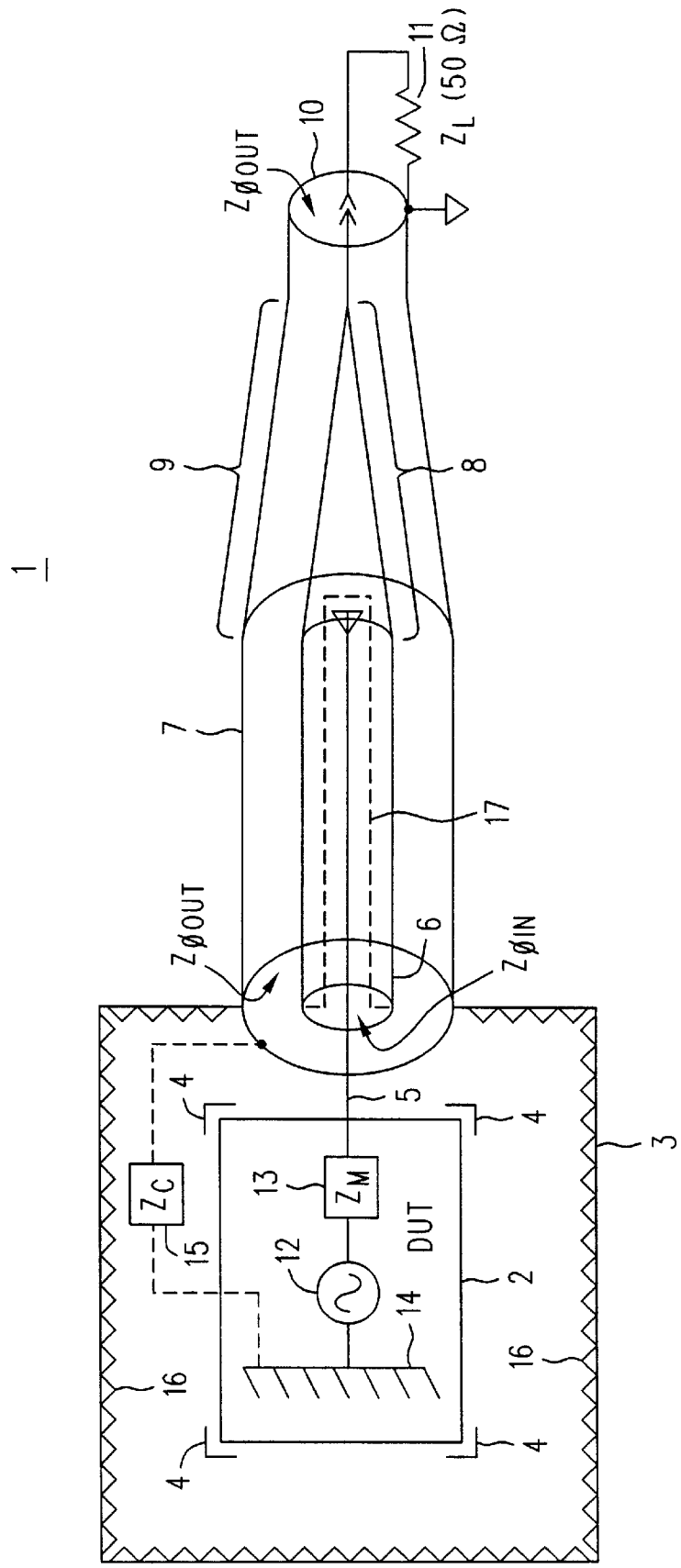
FIG. 1 is a simplified functional diagram of a broadband coupler for measurement of antenna signals.

Refer now to FIG. 1, wherein is shown a simplified functional diagram 1 of a broadband coupler for measurement of antenna signals. The diagram 1 is a hybrid, in that: a device under test (DUT) 2 is shown as in a block diagram; it includes some pictorial-like depictions of an antenna 5 for the DUT 2 and an RF tight box 3 with an internal layer 16 of material that absorbs RF energy; and it includes schematic symbols (11–15).

In particular, then, a DUT 2, such as a wireless phone or other radio device having an extensible antenna 5, is placed inside a conductive box 3. Conductive box 3 may be made of metal, and it is preferred that it have six surfaces: four sides and a top and bottom. Although we have not shown it, one or more of these surfaces can be swung out of the way, say, with hinges, or is either removable or otherwise detachable through the operation of suitable latches. Once opened, the box 3 receives the DUT 2 in one or more registration fixtures 4. Their purpose is to hold the DUT in a particular position within the box 3, so that antenna 5 is correctly positioned relative to a transmission line 6 that is described below. To this end, it will be appreciated that different models or types of DUT 2 may well require correspondingly different registration fixtures 4. Likewise, it will be appreciated that the general size (and perhaps even the shape) of the box 3 is quite dependent on the particular DUT it is to contain. As an example, a box 3 for a modem wireless phone, such as a Nokia 2160 might be about the size of a shoe box. For some other piece of equipment as DUT, the box 3 might need to be the size of a bread box, or even a foot locker.

Box 3 is conductive so that it may function as a shield to prevent stray signals in the outside environment from contaminating the measurements to be performed. It is also lined with a layer 16 of RF absorbent material, such as a layer of Polylron (an H field absorber) ⅛th inch thick. What this does is attenuate signals that radiate from the DUT in locations other than the antenna 5. Otherwise, they could reflect off the inside of the box 3 and eventually enter the coupler (6, 7 described below), which would then disturb the measurements. An E field absorber (e.g., carbon loaded foam) could be used instead, although a thicker layer of the stuff might be needed.

A conductive outer cylinder 7 adjoins one side of the box 3 at an aperture sized to match it, and the box 3 and outer cylinder 7 are electrically connected at the joint. Inside outer cylinder 7 is a conductive inner cylinder 6. Cylinders 6 and 7 are coaxial, and at the end near the box 3 the outer surface of inner cylinder 6 is supported by a suitable structure transparent to RF (e.g., a plastic bushing), but which is not shown in the figure. Antenna 5 extends a selected distance into the interior of inner cylinder 6. How far it extends will be discussed later. For now, it is sufficient to appreciate that it wants to extend a particular amount, and that a preferred way to get it is to use a depth fixture 17 that limits the depth of antenna insertion. The antenna 5 is simply first extended all the way and then is pushed back to the desired length by the fixture 17 as the DUT 2 is registered by fixtures 4. Depth fixture 17 might be removable, so that a different depth fixture could be used for a different DUT whose antenna penetration might be different.

The inserted portion of the antenna 5 becomes the center conductor of a coaxial transmission line formed with the inner surface of the inner cylinder 6. This is the input transmission line mentioned in the Summary Of The Invention. The outer surface of the inner cylinder 6 forms a coaxial transmission line with the inner surface of the outer cylinder 7. This is the output transmission line mentioned in the Summary. It has a characteristic impedance $Z_{0out}$ (arising from the inner diameter of cylinder 7, the outer diameter of cylinder 6 and the dielectric constant between them) that is selected to be convenient for the test equipment, test set or whatever measurement equipment is to be coupled to the signal radiating from the antenna 5. A preferred value for $Z_{0out}$ is 50Ω, although 75 Ω is a reasonable choice as well. Nor is $Z_{0out}$ limited to these values; in principle it can be any desired value. The characteristic impedance $Z_{0in}$ of the input transmission line is likewise affected by the outer diameter of the antenna 5, the inner diameter of cylinder 6 and the dielectric constant between them. It is selected in a manner described below, and will typically be in the range of 10 Ω to 200 Ω.

Subsequent to the region of inner cylinder 6 that accepts antenna 5, the inner cylinder 6 tapers over region 8 to become a simple solid center conductor for the output transmission line it forms with outer cylinder 7. To keep $Z_{0out}$ constant, however, outer cylinder 7 also tapers in a known manner over region 9, such that at a distal end 10 it may deliver power coupled from the antenna 5 to a matching terminating load $Z_L$ 11 that is the input impedance for the measurement equipment (not itself shown, but which might be a power meter or spectrum analyzer, or a variable attenuator ahead of one of those). At the distal end 10 of the output transmission line there might be a suitable RF connector (N, APC 7, APC 3.5 or SMA, etc.) that allows a length of flexible coax or hardline to deliver the signal to the measurement equipment. Selecting among different such connectors may alter the final diameter of the center conductor of the output transmission line (type N has a fatter center conductor than does SMA), which, if the characteristic impedance at that location is to remain unchanged, may in turn alter the inner diameter of the outer cylinder.

Meanwhile, back inside the box 3 we note that the DUT includes a generator 12 (which for a wireless phone is an RF power amplifier) coupled on one side (probably by a matching network 13 whose impedance is $Z_M$) to the antenna 5, and on the other side to a counterpoise 14, which is generally the chassis of the DUT. We note also that there is an equivalent coupling impedance $Z_C$ 15 between the counterpoise 14 and the lip of the outer cylinder 7 at the entrance to the output transmission line.

We wish to explain the electrical operation of the coupler. This will be accomplished in two steps. First, we shall present an intuitive explanation that is of a time domain nature, as was done in the Summary Of The Invention. Second, we shall present a condensed rigorous demonstration using the transmission line equations. That done, its physical construction will be largely a matter of choice.

To begin the intuitive explanation, consider that the generator 12 is a voltage source whose output is felt between the counterpoise 14 and the antenna 5. The equivalent source impedance of this voltage source is not readily known (let's call it $Z_X$), being the series composite of the inherent impedance of the generator itself taken with that ($Z_M$) of the matching network 13. This voltage is applied across the series combination of $Z_{0in}$, $Z_{0out}$ and $Z_C$, which acts as a voltage divider. The fraction of the applied voltage that appears across $Z_{0out}$ launches a propagating TEM (Transverse Electro-Magnetic) wave that delivers all of its power to the load $Z_L$ 11. That is because load $Z_L$ 11 is a proper termination for the output transmission line (7, 9, 10), which has $Z_{0out}$ as a constant characteristic impedance.

The fraction of the applied voltage that appears across $Z_{0in}$ launches a propagating TEM wave that travels along the input transmission line (5, 6). That transmission line is unterminated, however, so all power in that wave is reflected (save for dissipative losses, which we assume are negligible, and are ignored). That reflected power eventually returns to the entrance of the input transmission line, where it sees an impedance that is the series composite of $Z_X$ and $Z_{0out}$. From there it can go three places. $Z_X$ and $Z_{0out}$ make a divider, so some of the reflected power is accepted (first place) by $Z_X$, which may have resistive components that actually dissipate some of that power. Some of the reflected power is accepted (second place) by $Z_{0out}$, which is then also delivered to load $Z_L$ 11, albeit it somewhat later in time than the power entering it initially, as described earlier. It is unlikely that the series composite of $Z_X$ and $Z_{0out}$ are a proper termination for $Z_{0in}$, so the balance of the reflected power is re-reflected (third place) back into the input transmission line. Since the input transmission line is unterminated, that re-reflected power is again reflected and experiences the three-way split just described, and so on, until whatever is left is "used up". In this analysis, a repeated regression continues to augment (by fractions of a fraction of a fraction . . . ) the power delivered to the output transmission line. This "piecemeal delivery", as it were, allows, or synthesizes, a transformer (impedance conversion) action based on delayed delivery of stored energy, and that produces more power at the load $Z_L$ 11 than you would otherwise have a right to expect. Unfortunately, the analysis does not provide us with many clues about other parameters of interest, such as bandwidth and ripple. For that we need to apply the transmission line equations.

Refer now to FIG. 2, wherein is shown a simplified pictorial diagram of a wireless phone (2, 18) or other DUT having its antenna (5, 19) inserted into an input transmission line formed by that antenna and inner cylinder 6. The rest of the diagram is similar to FIG. 1 as it pertains to the outer cylinder 7 and the tapered sections leading to the load 11. Note the locations of A, B and C, which indicate locations between which there are impedances of interest.

FIG. 3 is an equivalent impedance diagram of the situation in FIGS. 1 and 2. In particular, note that the input transmission line 20 (the impedance from A to B) has length $L_1$ and is terminated with impedance $Z_{end}$ 20. The impedance from B to C forms the output transmission line 21, which has length $L_2$ and is terminated by the impedance $Z_L$ 11. We have already explained in a casual way that power gets from the input transmission line 20 into the output transmission line 21, and it is further believed that independent of that, the arrangement of FIG. 3 will be accepted as non-controversial by those skilled in transmission lines.

Now, from the (lossless) transmission line equations, the impedance between points A and B can be seen to be:

$$Z_{AB} = Z_{01}(Z_{end} + jZ_{01} \tan \beta L_1)/(Z_{01} + jZ_{end} \tan \beta L_1) \qquad \text{Eq. (1)}$$

(The symbol β represents the propagation constant for transmission lines, which in air is 2πf/c.)

Now, $Z_{end}$ is an open circuit, so the equation becomes:

$$Z_{AB} = Z_{01}/(j \tan \beta L_1) \qquad \text{Eq. (2)}$$

Our plan is to design the output transmission line 21 so that $Z_L$ is a termination that equals it characteristic impedance, $Z_{02}$. That done, the impedance between points B and C is $Z_{BC} = Z_L$.

Figure 4:
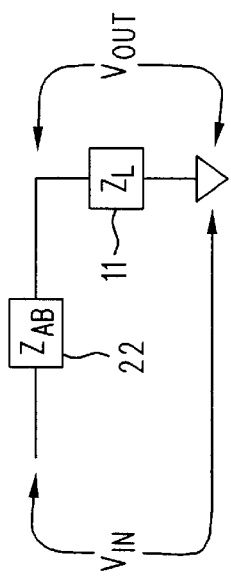
FIG. 4 is an equivalent circuit representing the transmission lines of FIG. 3.

The equivalent circuit of FIG. 4 may now be substituted for the entire coupler. From that it follows that:

$$V_{out}/V_{in} = Z_L/(Z_L + Z_{AB}) = Z_L/((Z_L + (Z_{01}/j \tan \beta L_1)) \qquad \text{Eq. (3)}$$

Figure 5:
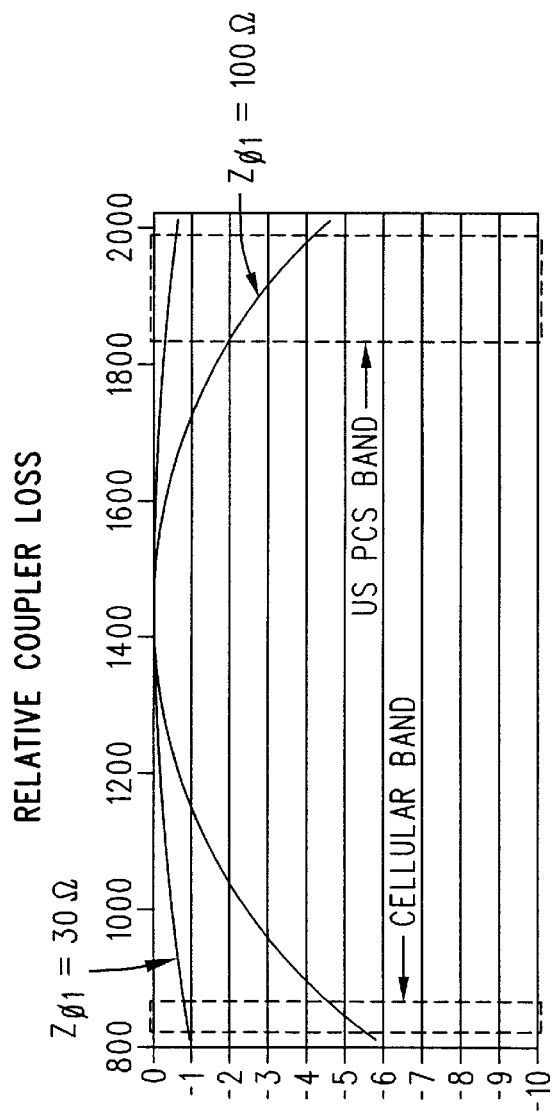
FIG. 5 is a plot of relative coupler loss for a particular coupler over a range of frequencies of interest to wireless telephones for two different characteristic impedances of the input transmission line in FIG. 3.

FIG. 5 is a plot of relative coupling loss for $Z_{0in} = 100$ Ω and for $Z_{0in} = 30$ Ω. $L_1$ was 5 cm, and it was assumed that there were no conductive losses. The use of the lossless transmission line equations instead of the lossy ones introduces a negligible error. Note that the variation is small over the cellular band (825–895 MHZ) and over the US PCS band (1850–1990 MHZ).

Equation (3) supports the following observations about the shape of the plots in FIG. 5:

(A) Increasing $L_1$ shifts the curve to the left, and decreasing $L_1$ shifts it to the right.

(B) The coupler is least sensitive to changes in frequency if the characteristic impedance $Z_{02}=Z_{0out}$ of the output transmission line matches the load $Z_L$. $Z_{0out}$ is, of course, affected by the ratio of its diameters.

(C) Lowering the characteristic impedance $Z_{01}=Z_{in}$ of the input transmission line also lessens the change in loss versus frequency. This may be done by lowering the ratio of the inner diameter of the inner tube to the diameter of the antenna.

It will also be noted from an inspection of the plot that curve peaks at no loss at some frequency. If two bands of operation were desired, such the cellular band and the PCS band, then it may be desirable to adjust $L_1$ such that the peak is at the geometric mean of the center frequencies $f_1$ and $f_2$ of the two bands: $f_{geom}=\sqrt{f_1^2+f_2^2}$. This will minimize the difference in response of the coupler over the two bands. The peak is at a minimum loss of zero dB, rather than at some other amount (say, in the range of from 2dB to 6dB) for two reasons. First, because the lossless transmission line equations were used. That means actual losses in a real transmission line are ignored. However, these errors are small. Second, and more significantly, the demonstration and its equations offered above do not account for any portion of the antenna that is not enclosed within the input transmission line. Any portion of the antenna that extends beyond the DUT but that does not enter the coupler will radiate, and will be seen as power that left the DUT but that did not appear at the output of the coupler (i.e., as loss). Essentially, the equations and the plot of FIG. 5 assume that all of the extended antenna penetrates the coupler. Such an ideal case is probably impractical, and the extent of such "exposed" antenna will probably vary with the make and model of the DUT. It is reasonable to expect actual coupler loss to be somewhere in the range of from about 2dB to about 6dB.

It will further be appreciated that the taper operates to gradually convert from the larger diameters of the antenna end to the small diameter needed for standard connectors. In this instance the taper acts to preserve the characteristic impedance of the output transmission line (rather than change it) as the diameters change to match the RF connector at the end. It is best if the taper is longer than one quarter of a wavelength at the lowest frequency of interest.

The actual diameters of the inner and out cylinders depends upon the characteristic impedances chosen for the input and output transmission lines, as well as the mechanics of mating with a selected connector to attach to $Z_L$ (which is in some test equipment), and are a matter of design choice.

Additionally, it will be appreciated that the coupler described exhibits reciprocity, and that it can be used to coupler RF energy into the antenna of a DUT with the same losses experienced when coupling power from the antenna.

Finally, it will also be appreciated that, while we have shown the coupler and described it as having sections 6 and 7 that are of constant diameter, what is really of interest is that these sections of the input transmission line 20 and output transmission line 21 have constant characteristic impedances. Suppose the antenna 5 of the DUT were tapered. Some extensible antennas are made of stepped diameter sections that slide inside each other to collapse the antenna. Then constant diameters for cylinders 6 and 7 in these regions would not be appropriate; they would want to be tapered, perhaps similar to regions 8 and 9, or stepped in correspondence with the diameter changes in the antenna. As another example, it often happens that an antenna, whether of a single section or collapsible, has a bead 23 on the end (see FIG. 2). It may be desirable to include corresponding diameter variations in the cylinders 6 (24) and 7 (25) that preserve, in the vicinity of the bead, the constant characteristic impedances of the input and output transmission lines.

We claim:

1. An antenna coupler for coupling the antenna of a device under test to an instance of test equipment, the antenna coupler comprising:

an inner cylinder having inner and outer surfaces of conductive material and into which at a first end thereof an antenna of a device under test is insertable for a selected depth along the axis of the inner cylinder, the inner cylinder having constant inner and outer diameters along a length at least equal to the selected depth starting at the first end, and thereafter for a second length the outer diameter of the inner cylinder tapering to a first selected diameter, the inner surface of the inner cylinder forming when the antenna is inserted therein an unterminated first coaxial transmission line of characteristic impedance $Z_{0in}$;

an outer cylinder having an inner surface of conductive material and having a first end thereof disposed generally opposite the first end of the inner cylinder and having the same axis as the inner cylinder, the outer cylinder containing the inner cylinder and having a constant inner diameter opposite the region of constant outer diameter for the inner cylinder and for the same length, and thereafter for the second length the inner diameter of the outer cylinder tapering to maintain a constant characteristic impedance $Z_{0out}$ as the outer diameter of the inner cylinder tapers to the first selected diameter, the inner surface of the outer cylinder forming with the outer surface of the inner cylinder a second coaxial transmission line also of characteristic impedance $Z_{0out}$; and an RF connection for conveying RF power coupled between the antenna and an instance of test equipment, the RF connection located at a distal end of the second coaxial transmission line opposite the first end.

2. An antenna coupler as in claim 1 further comprising:

a conductive RF tight box for containing a device under test and lined with RF absorbent materials, the box having a side with an aperture therein with which and from outside the box is conductively mated the first end of the outer cylinder.

3. An antenna coupler as in claim 1 further comprising a registration fixture within the RF tight box for holding the device under test in a location that positions its antenna to lie along the axis of the inner cylinder.

4. An antenna coupler as in claim 1 wherein the inner cylinder includes a depth stop to limit antenna penetration to the selected depth.

5. An antenna coupler as in claim 1 wherein $Z_{0out}$ is in the range of 50Ω to 75Ω and $Z_{0in}$ is in the range of 30Ω to 200Ω.

6. An antenna coupler as in claim 1 wherein the RF connection at the distal end of the second coaxial transmission line is a coaxial RF connector.

7. An antenna coupler as in claim 1 wherein the device under test is a wireless telephone.

8. An antenna coupler as in claim 1 wherein the device under test is a wireless pager.

9. An antenna coupler as in claim 1 wherein the device under test is a hand-held radio transceiver.

* * * * *